J. BLAUSTEIN.
CALCULATING MACHINE.
APPLICATION FILED APR. 20, 1917.

1,369,958.

Patented Mar. 1, 1921.
6 SHEETS—SHEET 1.

WITNESS
Howard P. King.

INVENTOR:
Joseph Blaustein,
BY Marble & Everett,
ATTORNEYS.

J. BLAUSTEIN.
CALCULATING MACHINE.
APPLICATION FILED APR. 20, 1917.

1,369,958.

Patented Mar. 1, 1921.
6 SHEETS—SHEET 3.

WITNESS
Howard P. King

INVENTOR:
Joseph Blaustein,
BY
Marble & Leverett,
ATTORNEYS.

J. BLAUSTEIN.
CALCULATING MACHINE.
APPLICATION FILED APR. 20, 1917.

1,369,958.

Patented Mar. 1, 1921.
6 SHEETS—SHEET 5.

WITNESS

Howard P. King

INVENTOR:
Joseph Blaustein,
BY
Marble & Everett,
ATTORNEYS.

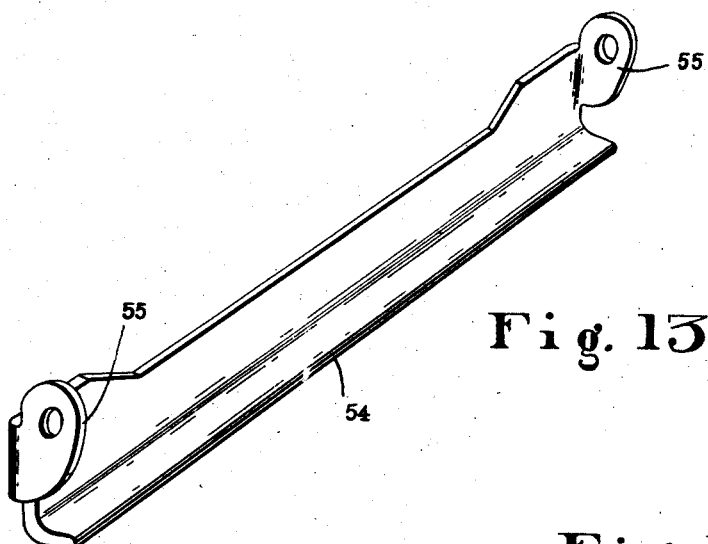
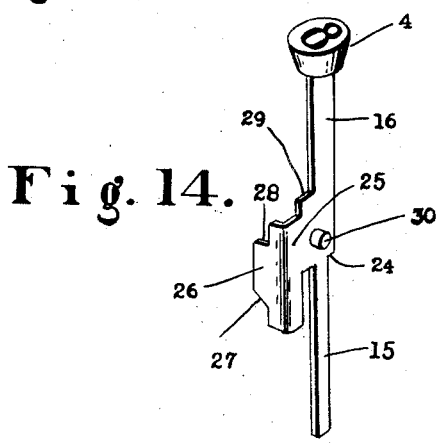# 
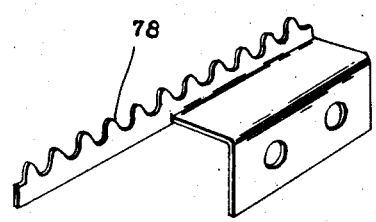
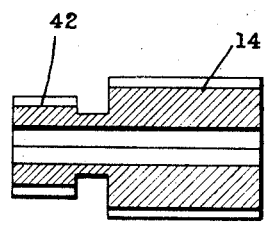
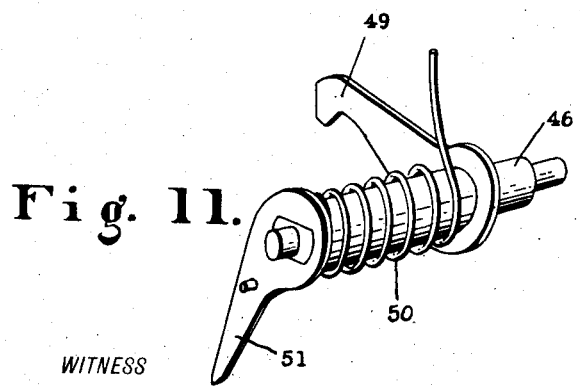
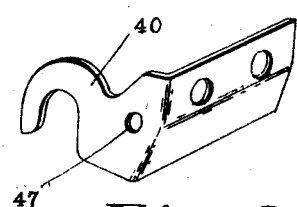

UNITED STATES PATENT OFFICE.

JOSEPH BLAUSTEIN, OF NEWARK, NEW JERSEY, ASSIGNOR TO THE CONTROLLER COMPANY, INCORPORATED.

CALCULATING-MACHINE.

1,369,958.   Specification of Letters Patent.   Patented Mar. 1, 1921.

Application filed April 20, 1917. Serial No. 163,348.

*To all whom it may concern:*

Be it known that I, JOSEPH BLAUSTEIN, a citizen of the United States of America, and a resident of Newark, in the county of Essex and State of New Jersey, have invented new and useful Improvements in Calculating-Machines, of which the following is a specification.

This invention relates to that class of calculating machines in which disks having parallel axes are used and keys are employed for setting the machine for successive operations through sliding setting gears adapted to be variably actuated by step gears, such machines being known as of the Thomas type.

The objects of the invention are to secure accurate and positive action, quietness and ease of operation; to enable the registering or index setting means for each row or digit to be positively locked except during its actuation; to release the registering or index setting means for each row of keys a greater or less period according to the numeral to be registered; to thus obtain a variable release lock which shall be in engagement only while no motion is required and at other times be out of engagement; to thus avoid noise, wear and inaccuracy; to operate such a variable release lock automatically and without any attention from the operator; to provide simple and effective means for positioning all of the setting gears so that they will be accurately engaged by their step gears; to utilize the positioning means for the setting gears in securing at the same time therewith automatic action of the said variable release lock means; to provide for each row of keys a swinging plate adapted to be operated by any one of them to actuate the setting gear and set the locking means; to combine with said swinging plate a sliding plate in translating the vertical movement of the keys into a movement at right angles thereto; to actuate a checking device or set up figure wheel directly from said sliding plate; to provide a swinging bar for holding a key depressed and for releasing that key when another is depressed or when the cycle of operations is finished; to enable said bar to provide a single edge for engagement with all the keys in the row; to provide improved means for automatically releasing said bar from the keys at the completion of an operation of the machine; to also provide erasing means operable either by hand or automatically for returning the swinging plate and slide plate to initial position; to secure a construction of sections one for each row of keys any one of which sections can be removed without removing the next adjacent sections; to at the same time secure a compact construction in which the rows of keys shall be near together, to secure a construction which can be economically and advantageously manufactured and in which the various parts are accessible for examination or adjustment; to secure simplicity of construction and operation, and to secure other advantages and results as may be brought out in the following description.

Referring to the accompanying drawings in which like numerals of reference indicate the same parts throughout the several views.

Fig. 9 is a detail perspective view of a rack normally carried by said slide plate, but shown independent thereof;

Fig. 10 is a detail perspective view of a certain bracket also normally carried by said slide plate;

Fig. 11 is a detail perspective view of a locking means for the setting gear shaft;

Fig. 12 is a longitudinal section of the setting gear and locking gear;

Fig. 13 is a detail perspective view of a certain locking bar for the keys, and

Fig. 14 is a detail perspective view of one of the keys.

In said drawings, 1 indicates the base of the machine and 2 the walls of a casing built up on said base to contain the working parts and 3, 3 and so forth, indicate sections of the upper part of the casing which carry each a row of setting keys 4. It will be understood that these sections extend from front to rear as the machine stands before the operator, each carrying keys with numerals from 1 to 9, and that there are as many sections in a series from right to left of the machine as may be necessary to give the machine its desired range of numbers.

Figure 2:
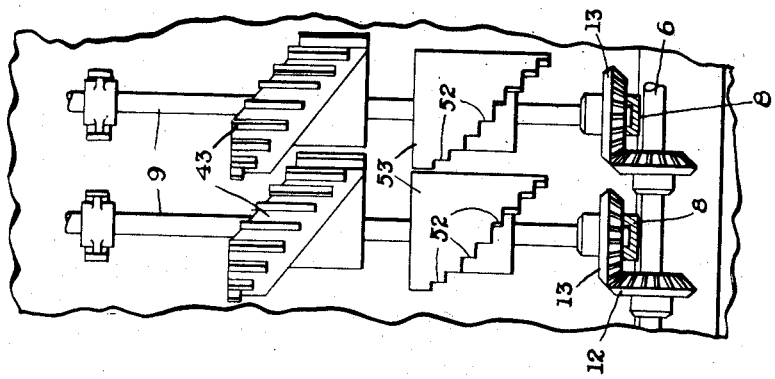
Fig. 2 is a plan view showing the relation of the step gears as the same are turned.
Figure 1:
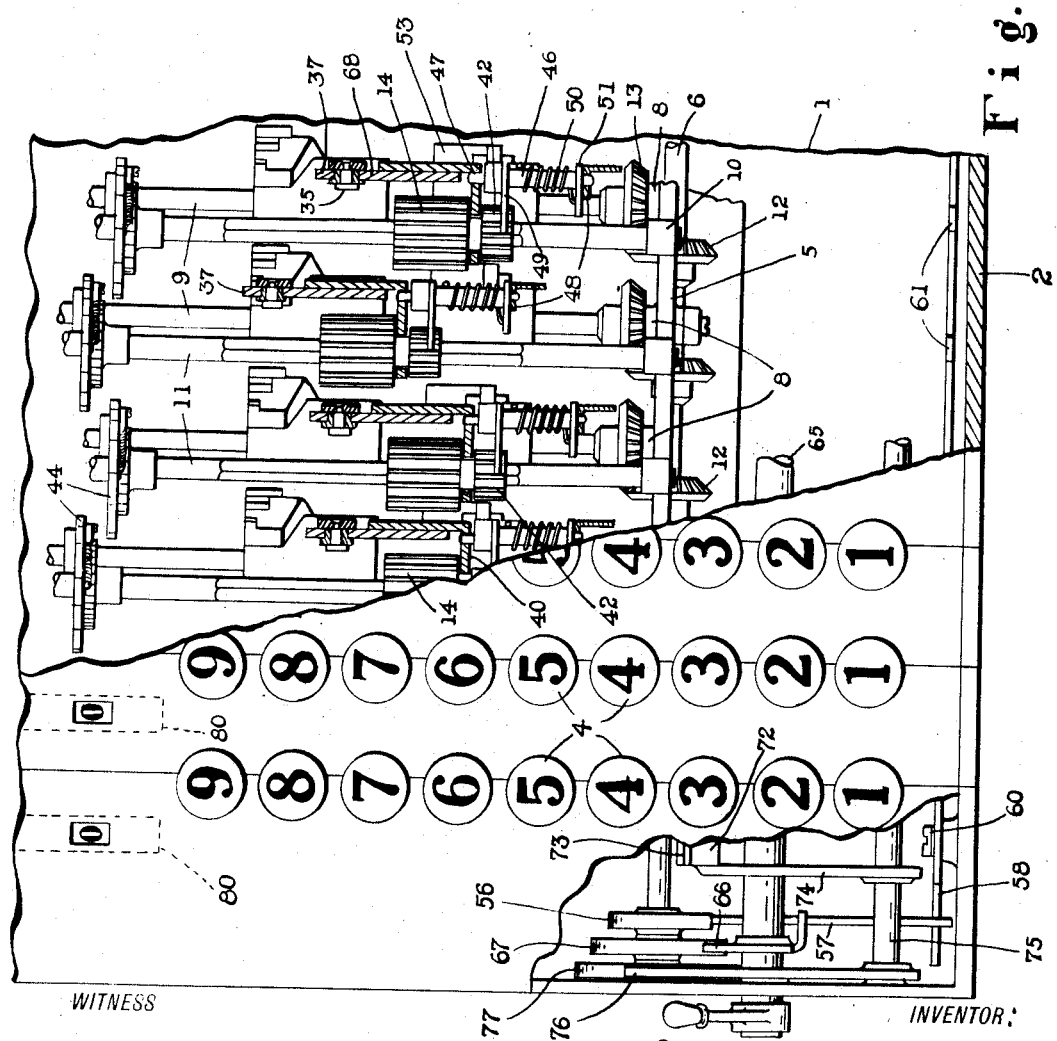
Figure 1 is a plan view of a portion of a calculating machine embodying my invention showing parts broken away and in section.
Figure 3:
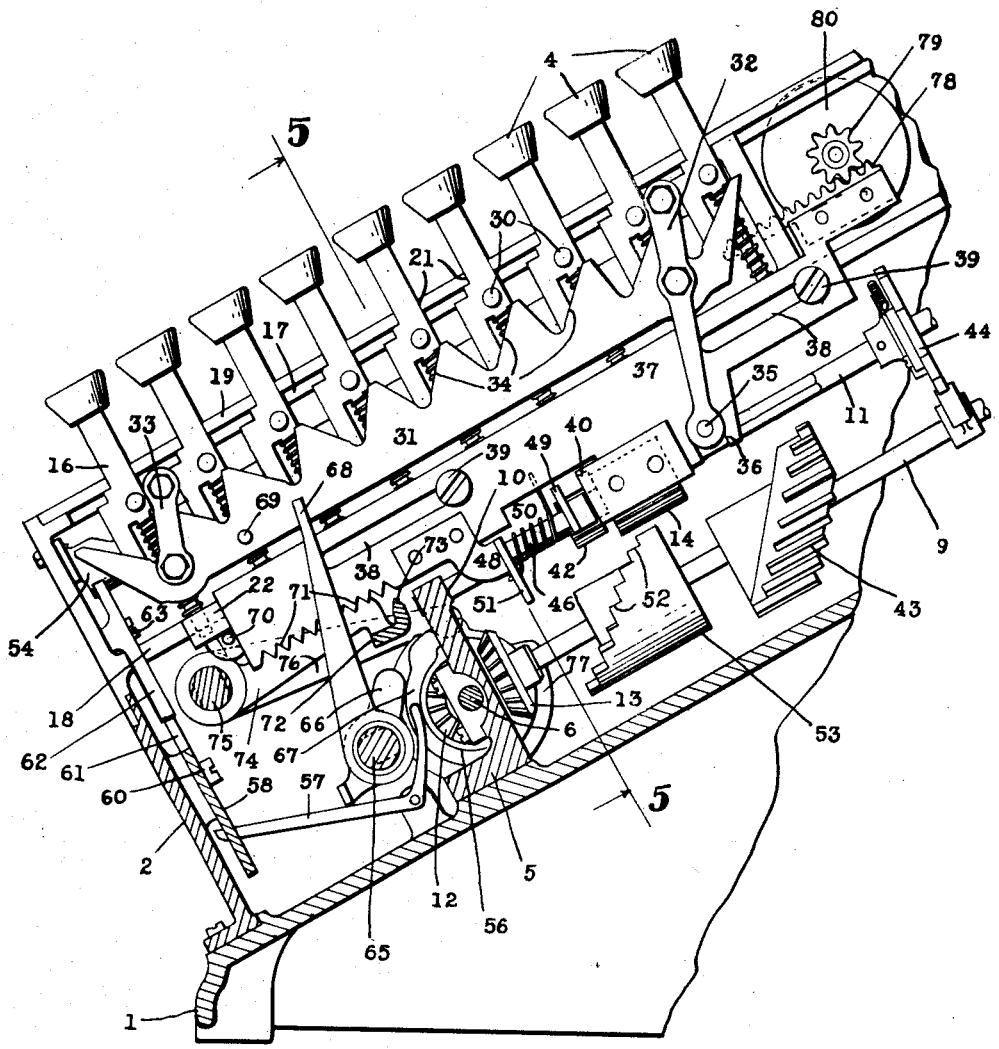
Fig. 3 is a transverse vertical section of the machine showing a row of keys all in normal position.
Figure 4:
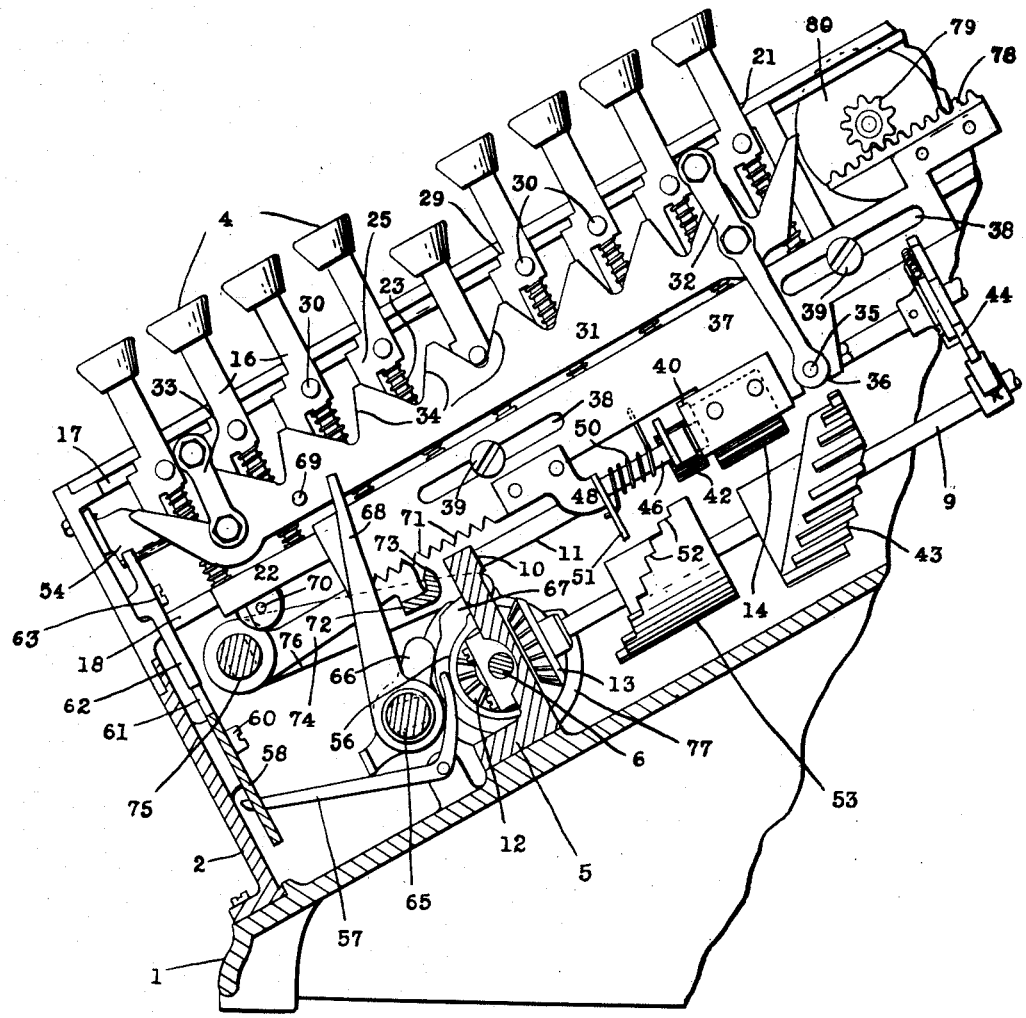
Fig. 4 is a similar cross-sectional view showing one of the keys depressed.
Figure 7:
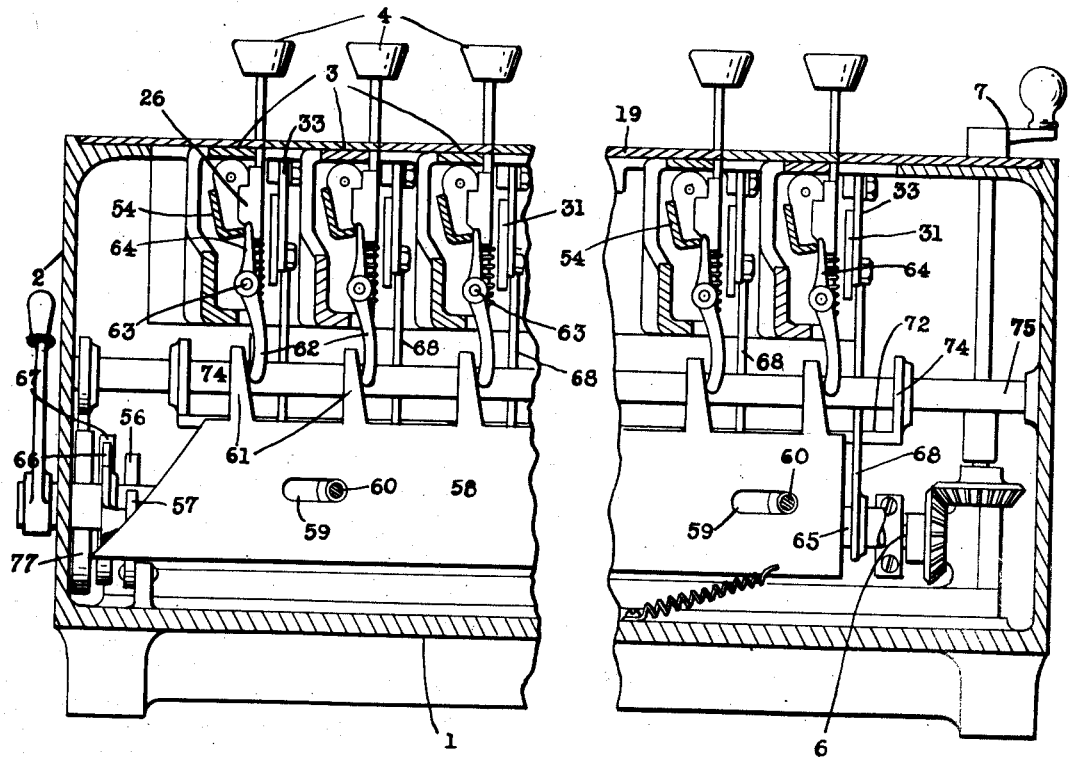
Fig. 7 is a longitudinal cross-sectional view taken upon a plane just inside of the front wall of the machine and looking toward the back of the machine.

Secured to the bottom or floor of the casing and standing edgewise therein is a casting 5, see Figs. 1, 3 and 4 especially, which extends from right to left of the operator and in which is journaled a shaft 6 longitudinally of the casting and adapted to be rotated as desired by a crank 7, as shown in Fig. 7, at the right hand end of the machine to operate the machine in calculating. Said casting 5 also provides lower bearings 8 for step gear spindles 9 and upper bearings 10 for setting gear spindles 11, see Figs. 1 and 2, which spindles extend rearward from the casting to operate the calculating mechanism. There is one of each of said spindles for each section 3 of the machine and each step gear spindle is connected to the shaft 6 by bevel gears 12, 13. It is to the means for operating the setting gears 14 by means of the keys 4, preliminary to turning the crank 7 to actuate the calculating mechanism that the present invention more particularly relates and which will next be described.

The setting keys 4 project from the tops of the sections, see Figs. 1, and 3 to 7, and are slidably mounted in said sections whereby they may be depressed. Preferably said keys, as shown in Fig. 14, are stamped out of sheet metal and provide each a foot 15 at its inner or lower end and a shank 16 at its outer or upper end, both said foot and shank extending longitudinally of the key by means of which the key may be mounted to slide longitudinally of itself. The casting or frame work of each section 3 provides a top piece 17 and a bottom bridge 18 spaced apart in substantially parallel relation, see Figs. 3 to 7, and flatwise upon the top piece is secured a top plate 19, said top plates of adjacent sections being contiguous at their edges so as to close the top of the machine, as shown in Fig. 1. A slot 20 is cut in the edge of the bridge and a slot 21 is cut in the corresponding edge of the top plate for each of the keys, the shank 16 of the key riding in the slot of the top plate and the foot 15 of the key riding in the slot of the bridge of the casting. A strip 22 secured to the edge of the bridge outside of the keys, holds the feet 15 thereof within their slots, and the adjacent top plate 19 holds the shank portions of the keys in their respective slots. In this manner, the keys are slidably held so as to be free to move up and down, and preferably a spring 23 is provided to normally slide each key upwardly, and, as shown in Figs. 3 to 7 of the drawings, said spring is placed upon the foot 15 and bears at its lower end against the bridge 18 and at its upper end against a downwardly facing shoulder 24 at the upper end of the foot 15. Between the upper end of the foot and the lower end of the shank of the key, the material is extended laterally in the plane of the foot and shank as at 25, and at the outer end of this lateral extension the material is bent on a line parallel to the foot and shank into a plane substantially perpendicular to that of the extension, providing thereby a portion 26 for purposes hereinafter described. At the bottom of said bent portion 26 and sloping upwardly toward its free edge is a downwardly facing shoulder 27, and at the top of the said bent portion is an upwardly facing shoulder 28. It is to be understood that the keys of any one row are positioned all at one side of the section 3, and the bent portion 26 projects inwardly of the section beneath the top piece 17 of the casting and the top plate. A stop 29 is provided on the key, preferably at one edge of the same to engage against the underside of the plate and accurately limit upward movement of the key. Each key has at its side opposite from the bent portion 26, that is, projecting away from the section, a pin 30 adapted, when the key is depressed, to engage a swinging plate 31 and operate the same.

This swinging plate (see Figs. 3, 4 particularly and Figs. 5 and 6) lies in edgewise position longitudinally of the section just outside the keys 4, being suspended by links 32, 33 near its opposite ends and which are pivoted to the top piece 17 of the casting on the outside of the plate. At its upper edge said swinging plate 31 has recesses the rear walls 34 of which are inclined upwardly rearward and adapted to be engaged each by one of the keys 4 or pins 30 thereon, so that as any key is depressed the swinging plate will be swung accordingly. These rear walls 34 incline differently each from the others, so that the plate will be swung more or less according to the key which is pressed. As shown in the drawings the wall 34 nearest the front of the machine which will be engaged by the first or front key slopes the least, that is, is inclined only slightly out of parallel relation to the direction of movement of the key, whereas the inclined wall for the last key has the greatest slope, and all of the intermediate rear walls slope more and more from the first to the last. By this means, the swinging plate will be moved a predetermined distance by any one key, and the distance it is moved will be different for each key of the row.

The link 32 at the rear end of the swinging plate 31 extends downward beyond said plate and is provided with a lateral pin 35 which enters a slot 36 extending upwardly from the lower edge of a slide plate 37, see Figs. 1, 3, 4 and 8 especially, said slide plate preferably lying in the same plane with the swinging plate 31, and having longitudinal slots 38, 38 near its upper edge to receive stationary screws 39 projecting from the bridge 18 of the section casting and upon which the plate can slide. The front end of this slide plate projects over in front of the casting 5 and behind said casting the lower edge of the slide plate is in proximity to and parallel to the setting gear spindle. The slide plate carries an arm 40 (see Fig. 10) transverse to the plate and extending beneath the section adapted to engage and slide a setting gear 14 upon its spindle 11. In the drawings, especially Figs. 10, 12, 1 and 3 to 6, engagement of this arm with the setting gear is effected by positioning the arm in an annular slot between said setting gear 14 and a locking gear 42 also movable with the setting gear and subsequently described. By this engagement the arm will move the setting gear longitudinally of its spindle as the slide plate moves, and carry said gear a greater or less distance according to which key is depressed. It is to be understood that a stepped gear 43 is fast upon the corresponding stepped gear spindle adapted to engage and turn the setting gear through a greater or less arc dependent upon the relative position of said setting gear longitudinally of its spindle.

The stepped gear 43 as I prefer to make the same and shown in Figs. 1 to 6 provides teeth which have their ends toward the front of the machine terminating at different distances from the front end of the gear, the successive teeth being progressively farther from said end, or stepped. The particular arrangement and relation of parts shown is such that movement of the slide plate and setting gear under the influence of the first key bearing the numeral "1" will slide said setting gear into position to be engaged and actuated by only one tooth of the stepped gear; movement under the influence of the next key bearing the numeral "2" will slide said setting gear into position to be engaged and actuated by two teeth of the stepped gear, and so forth for all nine keys. Furthermore, in manufacture, the back end of the stepped gears will be cut away diagonally to permit said gears to overlap and pass one another upon being rotated, see Fig. 2, without necessitating a separation of the stepped gear shafts as great as the full diameter of the stepped gears. In this way I am enabled to obtain a compact construction. As shown, the setting gear is long enough that when its rearward end is in the path of the first or shortest tooth of the stepped gear, its forward end is still in the path of the last tooth of the stepped gear so as to be actuated, when slid to such position, by all the teeth of the stepped gear.

In order to prevent rotation of the setting gear spindle except for the interval during which it may have to rotate under the influence of the stepped gear, I may employ the usual Geneva movement comprising a peripherally recessed disk 44 on the setting gear spindle, see Figs. 1 and 3 to 6, but it will be understood by those skilled in the art that this Geneva movement must release the spindles with respect to each other for the maximum engagement of the setting gear and step gear, that is to say, during the time which will be required for all the teeth of the step gear to engage the setting gear. Therefore when only one of a few teeth of the step gear engage the setting gear, as when the key for a lower numeral is depressed, there is an interval of time during which the setting gear spindle is not locked. It is one of the objects of my invention to provide means for locking the setting gear spindle against any possible movement during this interval and yet enabling said locking means to be released at various times, according to what key is depressed, but in all cases immediately prior to the engagement of the step gear with the setting gear.

Figure 5:
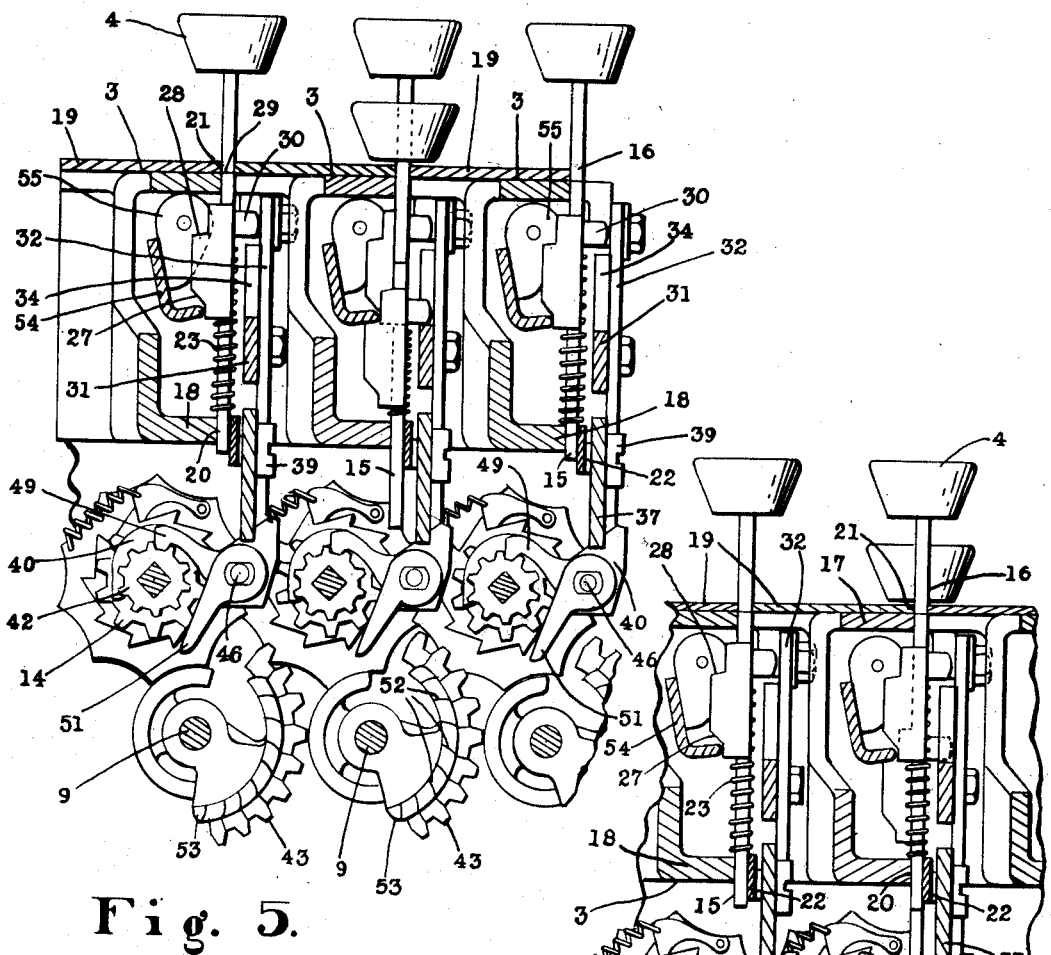
Fig. 5 is a sectional view on line 5—5 of Fig. 3, showing one of the keys in depressed position.
Figure 6:
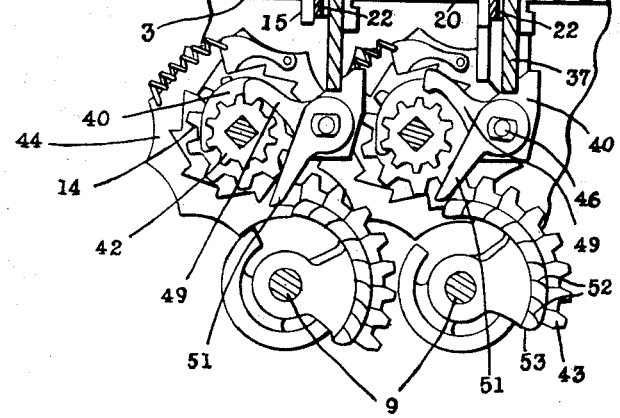
Fig. 6 is a similar view showing the step gear and cylinder partially rotated.

In carrying out this feature of my invention, I provide the locking gear 42, see Figs. 5 and 6, fast to the setting gear 14, preferably integral therewith, as shown in Fig. 12, and adapted to slide therewith, and parallel to the setting gear spindle 11, and carried by the sliding plate 37 I provide a rock shaft 46, which for convenience I have shown, in Figs. 1, 3 to 6 and 11, mounted at one end in a bearing 47 in the arm 40 and at its other end in the corresponding bearing of another arm 48 formed upon the slide plate. This rock shaft has upon itself a pawl 49 which is normally pressed into locking engagement with the gear 42 by means of a spring 50. The rock shaft also carries fast upon itself a tripping arm 51 and is adapted to be engaged by any one of the stepped surfaces 52 of a segmental cylinder 53 fast upon the step gear spindle 9, see Figs. 1 to 6. The steps of said cylinder correspond to the steps of the step gear, and thus according as the slide plate is positioned by one of the keys the tripping arm is positioned opposite the appropriate step of the cylinder and will be engaged thereby to release the locking pawl just at the same instant as the corresponding tooth of the step gear engages the setting gear, see Fig.

6. Also as soon as the step gear disengages the setting gear the step cylinder will release the trip, so that the setting gear spindle will be locked except during the interval of actual engagement of the stepped gear with the setting gear. In this connection, it may be added by way of explanation, that the Geneva locking means above described is usually combined with a ratchet and pawl whereby under positive actuation rotation may be caused by the next adjacent registering means to obtain what is commonly known as the "tens" transfer. I wish it to be particularly understood, however, that I could employ the locking gear 42 and pawl 49 if desired, to act as a pawl and ratchet and thereby permit the movement for the tens transfer.

In order to hold any key of a row depressed, or permit a depressed key to return to its outward position when a second one of that row is depressed and the second one held, locking means are provided. The means shown, see Figs. 13, 5 and 6, comprises a swinging locking bar 54 which extends longitudinally of the section adjacent the row of keys at the sides thereof having the bent portions 26 heretofore described. This locking bar is pivoted adjacent its ends to swing bodily away from the keys, and as shown is made in a sort of angle-iron cross-section with one flange projecting toward the keys and the other flange provided with ears 55, 55 by means of which the bar is pivoted to the opposite ends of the section casting. The flange projecting toward the keys is adapted to normally underlie the lower or downwardly facing sloping shoulders 27 of all the keys, so that depression of any one key will swing the bar. Further depression of the key brings its upwardly facing shoulder 28 below said flange of the bar which may then swing in toward the keys again and hold that one depressed. Should another key of that row thereafter be depressed, the bar is swung outward by the second key thereby releasing the first one and permitting it to return to its initial position. It will be understood that this locking bar swings with a minimum friction and thus presents minimum resistance to depression of the keys.

For swinging said locking bar 54 and indeed all of the locking bars of the machine after the setting of the registering mechanism, that is to say, near the end of the revolution of the crank 7, so as to release any keys which have been depressed, preparatory to pressing others for a further calculation, I provide upon the shaft 6, see Figs. 1, 3, 4 and 7, a cam 56 which operates a bell crank lever 57 so as to slide from left to right of the machine, a comb 58 mounted upon the front wall of the casing as by slots 59, 59 receiving screws 60, 60. This comb has at its upper edge teeth 61 adapted each to engage the lower arm of a lever 62 pivoted as at 63 upon each casing section and swing said lever so that its upper arm 64 will push the locking bar away from the keys so as to release them and permit their springs to throw them into upper or normal position. Any other suitable mechanism may be employed for thus releasing keys at the proper time, ready for setting up a new number.

In conjunction with the release of the keys and correspondingly timed therewith, I desire to have some erasing means operate positively to restore the swinging plate 31 to normal position, and for this purpose I have shown a shaft 65 extending from right to left of the machine preferably just forward of the shaft 6 and provided with an arm 66 adapted to be engaged at the proper moment by a cam 67 on said shaft, see Figs. 1, 3, 4 and 7. This rocks the shaft 65 so that arms 68 fast upon said shaft, one for each section, will engage each a pin or projection 69 upon the swinging plate 31 and return it to normal or zero position. Preferably such normal position is determined by means of a stop 70 upon the section casting adapted to engage the end of the slide plate 31, see Figs. 3 and 4.

Figure 8:
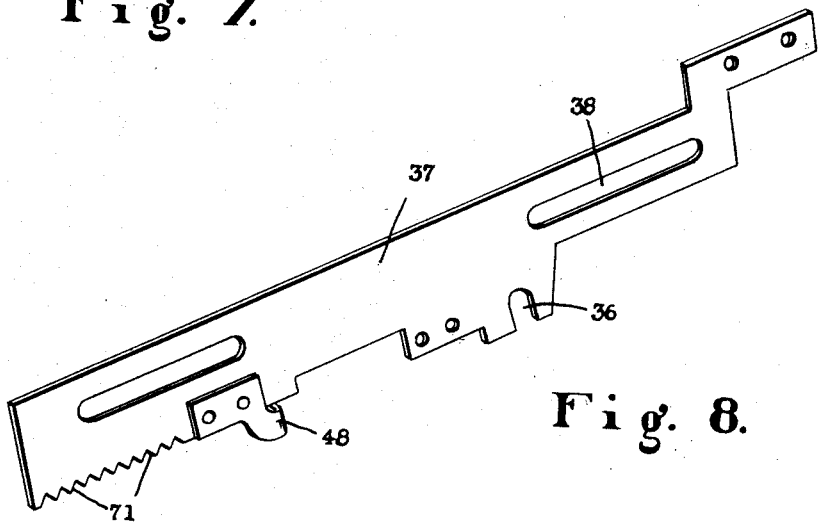
Fig. 8 is a detail perspective view of a certain slide plate.

In order to accurately line all the setting gears of the various sections of the machine, each sliding plate 37 is provided at any convenient point such as the lower edge of its front end with a series of V-shaped notches 71 one for each of the ten positions which the sliding plate may occupy, see Figs. 3, 4 and 8 and an alining bar 72, see Figs. 1, 3 and 4, extends from right to left of the machine beneath said notches and has a correspondingly tapered upturned edge 73 to enter the same. Said alining bar has arms 74, 74 at its opposite ends which are fastened upon a shaft 75 near the front of the machine and journaled in any suitable bearings upon the casing. Said shaft 75 is also provided with an arm 76 which extends rearwardly and is adapted to engage a cam wheel 77 upon the shaft 6, said cam wheel being arranged and adapted to throw the arm upward soon after the shaft 6 begins to turn and hold it upward until shortly before the shaft stops. This causes the alining bar to enter whichever notches of the slide plates of the various sections are over it as determined by the positions which the slide plates have assumed under the controlling influence of the keys, and thereby aline the slide plates and thus the setting gears with absolute accuracy, and holding them so during the operation or until the alining bar is again lowered.

The end of the sliding plate 31 toward the back of the machine may carry a rack 78, as shown in Figs. 3, 4 and 9, which engages a gear wheel 79 connected to a setting up figure wheel 80 and display through a sight hole in the top plate 19 numbers corresponding to those for which the keys have been depressed and thus check the accuracy of the operation.

It is to be particularly noted in my improved construction, that by removing the top plates on opposite sides of a row of keys, the section 3 may be lifted out of the machine, thus saving the tedious labor of removing all of the sections from one side of the machine to the one desired to be removed, as is customary in most of the present types of machines. As there are no parts supported partly from the section casting and partly from the base, removal of the section does not affect adjustments in any of the parts or will any parts be liable to damage by failure to loosen them before attempting to remove the section.

In operation, the slide plate 37 and swinging plate 31 of each section are initially at their forward or zero position, see Fig. 3. The number to be used in the calculation may then be set up by pressing the proper key in each row to its inner position, see Fig. 4. Depression of the key engages its laterally projecting pin 30 with the inclined rear wall 34 of the swinging plate 31, and continued depression of the key causes said plate to swing in its own plane longitudinally of the row of keys. Depression of the key also engages the sloping downwardly facing shoulder 27 thereof with the swinging locking bar 54, the key thereby pushing the bar aside and holding it thus swung until the key is entirely depressed to its innermost position, at which time said bar will swing back into its original position and engage above the upwardly facing shoulder 28 of the key and thereby hold the key in its depressed position. The swinging of the plate 31 by the key obviously causes the supporting links 32, 33 to swing also, and the link 32 through its slot and pin connection with the slide plate 37, moves said slide plate rearwardly. By virtue of the progressively increasing slopes of the successive rear walls 34 of the swinging plate, the swinging plate and slide plate are moved farther rearwardly by keys nearer the rear of the machine than the front. Therefore, each key will slide the slide plate a predetermined distance different from any of the other keys. By virtue of the arm 40 carried by the slide plate, the setting gear 14 and locking gear 42 are also slid rearwardly upon their spindle 11 and the setting gear positioned in proper relation to the step gear so that upon rotation of said step gear through a full revolution the proper rotation of the setting gear is obtained. The tripping arm 51 is also carried rearwardly by sliding the slide plate and is positioned opposite its segmental cylinder 53 in the same relation as the setting gear and step gear, so that the locking pawl 40 may remain in the locking gear 42 until the very moment when the setting gear and step gear begin to mesh, and at this moment the tripping arm engages the segmental cylinder and thereby raises the pawl from the locking gear, see Fig. 6. When the step gear passes out of mesh from the setting gear the tripping arm will pass over the edge of the segmental cylinder and permit the pawl to again engage in the locking gear thereby preventing inadvertent rotation of the spindle 11. It is to be understood that operation of the step gear and segmental cylinder is obtained after the keys have been depressed by rotation of the crank 7, see Fig. 7, which rotates the shaft 6, and, through the bevel gears 12, 13, rotates the step gear spindles 9. As the crank is started to be turned, the cam 77 swings the arm 76 upwardly thereby lifting the alining bar 72 to engage the same with the notches 71 in the slide plate and very positively and securely position said slide plate so as to obtain accurate alinement of the setting gear with respect to its step gear, the alining bar operating upon all of the slide plates regardless of what key is depressed in any one row. Furthermore, the alining bar is held lifted in engagement with the slide bar until near the end of the rotation of the crank at which time it is permitted to lower and the cam 56 operates upon the bell crank lever 57 sliding the comb 58 and tripping the swinging locking bars 54 through the agency of the several levers 62. Swinging of these locking bars permits the springs 23 on such keys as were depressed to actuate said keys outwardly, after which the cam 56 permits the bell crank to swing back and the locking bars to also swing into their normal position underlying the sloping shoulders of the keys. The other cam 67 will rotate the shaft 65 just after the keys are released and thereby cause the arms 68 to swing forwardly and engage the pins 69 on the several swinging plates 31 pushing them forwardly into their initial or zero positions, and obviously sliding the slide plates 37 also back into their zero positions.

In setting up the numbers, it may be noted that where one key of a row has been depressed and another key of the same row is afterward depressed that this swings the locking bar out again and thereby automatically releases the first key which was depressed and the locking bar will then swing in again to lock the last key down. It may be noted in this connection that the recesses formed in the swinging plates 31 have not only inclined rearward walls 34 but also have inclined front walls converging with respect to the rear walls toward the bottom of the plate so that the recesses are substantially V-shape. Since the positive alining is obtained by the alining bar 73 coacting with the slide bars 37, it is not necessary to have any vertical pockets at the bottom of these V-shaped recesses for alining purposes. Consequently, any movement of the swinging plate 31 one way or the other will positively force any of the keys upward which are depressed at the time of that movement. For instance, in Fig. 4 one key is shown depressed, and if another key were now to be depressed and for any reason the spring on the one which is depressed failed to force it upward when released by the bar 54, it is obvious that the second key being depressed would move the swinging plate 31 either toward the front or rear of the machine and as a consequence either the front or rear inclined wall of the recess for the depressed key would wedgingly engage the pin 30 thereon and force the key outward. It is therefore not possible in this construction, as occurs frequently in other machines, that two keys within the same section could become accidentally jammed in a half way position and thus lock the entire mechanism until repairs were effected.

Furthermore, the operator is enabled to check up the number which he sets up by means of the setting up figure wheels 80 which display the respective numbers for which the slide plates are set. Obviously, if through some inadvertence the slide plate is moved from its forward position without any keys having been depressed, the figure set up wheel will show this, and the operator can remedy the error.

Obviously various modifications and changes may be made in the manufacture of my improved machine without departing from the spirit and scope of the invention, and I do not wish to be understood as limiting myself except as required by the following claims when construed in the light of the prior art.

Having thus described the invention, what I claim is:

1. In a calculating machine, a setting gear, means for locking said setting gear, means for actuating said gear for varying periods of time, and means for releasing said locking means for varying periods of time corresponding to the said varying periods of time of actuation.

2. In a calculating machine, a setting gear, means normally locking said setting gear against inadvertent rotation, means normally dissociated from said locking means but operative to coact therewith to release the same, and means for simultaneously actuating said setting gear and releasing means for varying periods of time.

3. In a calculating machine, a setting gear, means normally locking said setting gear against inadvertent rotation, and rotatable means normally dissociated from said setting gear and locking means but operative to coact therewith and simultaneously turn said setting gear and release said locking means for varying periods of time.

4. In a calculating machine, a setting gear, means normally locking said setting gear against inadvertent rotation, and rotatable means normally dissociated from said setting gear and locking means but operative to coact therewith and simultaneously turn said setting gear and release said locking means for varying periods of time each of which is of the same duration for both setting gear and locking means.

5. In a calculating machine, the combination with a step gear, and a setting gear adapted to be independently moved to different longitudinal positions relative to the step gear and actuated therefrom, of means for normally locking said setting gear against inadvertent rotation, rotatable means normally dissociated from said locking means but operative to coact therewith and release the same, and means for turning said step gear and releasing means together to release the locking means and rotate the settating gear both for the same period of time.

6. In a calculating machine, the combination with a step gear, and a setting gear adapted to be independently moved to different longitudinal positions relative to the step gear and actuated therefrom, of means for normally locking said setting gear against inadvertent rotation, rotatable means normally dissociated from said locking means but operative to coact therewith and release the same, and means for turning said step gear and releasing means for variout periods each of which is of the same duration for both step gear and releasing means.

7. In a calculating machine, a setting gear, locking means for said gear, a step gear for variably actuating said setting gear, and a release for said locking means adapted to release said setting gear for various periods corresponding to its various periods of actuation by the step gear.

8. In a calculating machine having a rotatable step gear and a rotatable and longitudinally slidable setting gear rotatable more or less by the step gear dependent upon the position to which said setting gear is slid, and means slidable with said setting gear for preventing inadvertent rotation of the setting gear during the entire period of disengagement of said gears and permitting rotation during the period of actual engagement of the gears.

9. In a calculating machine having a rotatable step gear and a rotatable and longitudinally slidable setting gear rotatable by the step gear more or less dependent upon the position to which said setting gear is slid, means slidable with said setting gear for preventing inadvertent rotation of the setting gear during the entire period of disengagement of said gears, and means for disengaging said preventing means and permitting rotation of the setting gear during the period of actual engagement of the gears.

10. In a calculating machine having a rotatable step gear and a rotatable and longitudinally slidable setting gear rotatable by the step gear more or less dependent upon the position to which said setting gear is slid, means slidable with said setting gear for preventing inadvertent rotation of the setting gear during the entire period of disengagement of said gears, and means also slidable with said setting gear for disengaging said preventing means and permitting rotation of the setting gear during the period of actual engagement of the gears.

11. In a calculating machine, a step gear, a setting gear, one of said gears being longitudinally movable with respect to the other whereby rotation of the step gear will rotate the setting gear more or less dependent upon the relative positions of the gears longitudinally, a pawl for preventing inadvertent rotation of the setting gear during the entire period of disengagement of said gears, and means for disengaging said pawl substantially as the gears intermesh.

12. In a calculating machine, a step gear, a setting gear adapted to be engaged and rotated by the step gear, a locking gear fast with respect to the setting gear so as to move therewith, said setting gear and locking gear being movable longitudinally whereby the setting gear will be engaged by the step gear during greater or less portions of the period of rotation of the step gear, a pawl adapted to engage in the locking gear for preventing inadvertent rotation of the locking and setting gears during the entire period of disengagement of the setting and step gears, and means for disengaging said pawl from the locking gear substantially as the setting and step gears intermesh.

13. In a calculating machine, a step gear, a setting gear adapted to be engaged and rotated by the step gear, a locking gear fast with respect to the setting gear so as to move therewith, said setting gear and locking gear being movable longitudinally whereby the setting gear will be engaged by the step gear during greater or less portions of the period of rotation of the step gear, a pawl slidable with the locking gear adapted to engage the same for preventing inadvertent rotation of the locking and setting gears during the entire period of disengagement of the setting and step gears, and means for disengaging said pawl from the locking gear substantially as the setting and step gears intermesh.

14. In a calculating machine, a step gear, a setting gear adapted to be engaged and rotated by the step gear, a locking gear fast with respect to the setting gear so as to move therewith, said setting gear and locking gear being movable longitudinally whereby the setting gear will be engaged by the step gear during greater or less portions of the period of rotation of the step gear, a pawl adapted to engage in the locking gear for preventing inadvertent rotation of the locking and setting gears during the entire period of disengagement of the setting and step gears, a tripping arm adapted to be swung and thereby disengage the pawl, and means for swinging said tripping arm and holding said pawl disengaged only during the period of actual engagement of the setting and step gears.

15. In a calculating machine, a step gear spindle, a setting gear spindle, a setting gear slidable on said setting gear spindle, a step gear on said step gear spindle adapted to coact with the setting gear and rotate the same more or less, and means for preventing inadvertent rotation of the setting gear spindle during the entire period of disengagement of said gears and permitting rotation during the period of actual engagement of the gears.

16. In a calculating machine, a step gear spindle, a setting gear spindle, a setting gear on said setting gear spindle, a step gear on said step gear spindle adapted to coact with the setting gear and rotate the same more or less, means for preventing inadvertent rotation of the setting gear spindle during the entire period of disengagement of said gears, and means for disengaging said preventing means so as to permit rotation of the setting gear spindle during the period of actual engagement of the gears.

17. In a calculating machine, a plurality of setting gears, step gears for variably actuating said setting gears, means for moving each setting gear longitudinally of its axis with respect to its step gear, and means for simultaneously positioning a plurality of said setting means after they have been operated.

18. In a calculating machine, a plurality of setting gears, step gears for variably actuating said setting gears, means for holding each setting gear and moving it longitudinally of its axis with respect to its step gear, and means for simultaneously positioning a plurality of said setting means after they have been operated.

19. In a calculating machine, a plurality of setting gears, step gears for variably actuating said setting gears, members one for moving each setting gear longitudinally of its axis with respect to its step gear, each member having a series of positioning bearings, and means adapted to simultaneously engage said positioning bearings on a plurality of said moving members.

20. In a calculating machine, a plurality of setting gears, step gears for variably actuating said setting gears, members one for moving each setting gear longitudinally of its axis with respect to its step gear, each member having a series of notches, and means adapted to engage said notches on a plurality of said moving members.

21. In a calculating machine, the combination with a step gear, and a setting gear adapted to be independently moved to different longitudinal positions relative to the step gear and actuated therefrom, of means for normally locking said setting gear against inadvertent rotation, means normally dissociated from said locking means but operative to coact therewith and release the same, and means for simultaneously actuating said step gear and releasing means for various periods.

22. In a calculating machine, a step gear spindle, a step gear and a segmental cylinder on said spindle, a slidable and rotatable setting gear adapted to mesh with said step gear and be rotated thereby more or less dependent upon the position to which it is slid, a slide plate for sliding said setting gear, a pawl carried by said slide plate for preventing inadvertent rotation of the setting gear, and means also carried by said slide plate adapted to be engaged by said segmental cylinder and be operated thereby for disengaging said pawl whereby the setting gear may rotate.

23. In a calculating machine, a step gear spindle, a step gear and a segmental cylinder on said spindle, a slidable and rotatable setting gear adapted to mesh with said step gear and be rotated thereby more or less dependent upon the position to which it is slid, a slide plate for sliding said setting gear, a pawl carried by said slide plate for preventing inadvertent rotation of the setting gear, and means also carried by said slide plate adapted to be engaged by said segmental cylinder and be operated thereby for disengaging said pawl whereby the setting gear may rotate, said segmental cylinder being stepped to correspond with the step gear whereby disengagement of the pawl is obtained for a period corresponding to the meshing of the gears.

24. In a calculating machine, a step gear spindle, a step gear and a segmental cylinder on said spindle, a slidable and rotatable setting gear adapted to mesh with said step gear and be rotated thereby more or less dependent upon the position to which it is slid, a slide plate in engagement with said setting gear for sliding the same longitudinally substantially to any one of a plurality of positions and holding it where slid, a pawl carried by said slide plate for preventing inadvertent rotation of the setting gear, means also carried by said slide plate adapted to be engaged by said segmental cylinder and be operated thereby for disengaging said pawl whereby the setting gear may rotate, said segmental cylinder being stepped to correspond with the step gear whereby disengagement of the pawl is obtained for a period corresponding to the meshing of the gears, and means for positioning said slide plate after it is slid so as to accurately line the gears and steps of the segmental cylinder with the pawl disengaging means.

25. In a calculating machine, a step gear, a setting gear adapted to slide longitudinally of its axis with respect to the step gear, means for locking said setting gear, and means for unlocking said setting gear for periods corresponding to the periods of its actuation by said step gear.

26. In a calculating machine, a setting gear slidable longitudinally of its axis, means for locking said setting gear, and means longitudinally stationary with respect to said setting gear for variably actuating the same and unlocking it for various periods corresponding to the periods of actuation.

27. In a calculating machine, a setting gear slidable longitudinally of its axis, means for locking said setting gear slidable therewith, and means longitudinally stationary with respect to said setting gear for variably actuating the same and unlocking it for periods corresponding to the various periods of actuation.

28. In a calculating machine having a rotatable step gear and a rotatable and longitudinally slidable setting gear rotatable more or less by the step gear dependent upon the position to which said setting gear is slid, means for preventing inadvertent rotation of the setting gear during the entire period of disengagement of said gears and permitting rotation during the period of actual engagement of the gears.

29. In a calculating machine having a rotatable step gear and a rotatable and longitudinally slidable setting gear rotatable by the step gear more or less dependent upon the position to which said setting gear is slid, means for preventing inadvertent rotation of the setting gear during the entire period of disengagement of said gears, and means for disengaging said preventing means and permitting rotation of the setting gear during the period of actual engagement of the gears.

30. In a calculating machine, the combination with a step gear, and a setting gear slidable with respect to said step gear, of means sliding with the setting gear for releasably locking it against inadvertent rotation, and a member adapted to rotate with the step gear for unlocking said setting gear for the period of its actuation by said step gear.

31. In a calculating machine, the combination with a step gear, and a setting gear slidable with respect to said step gear, of means sliding with the setting gear for releasably locking it against inadvertent rotation, and a segmental cylinder adapted to rotate with the step gear for unlocking said setting gear for the period of its actuation by said step gear.

32. In a calculating machine, the combination with a step gear, and a setting gear slidable with respect to said step gear, of means sliding with the setting gear for releasably locking it against inadvertent rotation, and a segmental cylinder adapted to rotate with the step gear having steps for unlocking said setting gear for the period of its actuation by said step gear.

33. In a calculating machine, the combination with a step gear, and a setting gear slidable with respect to said step gear, of a spring-controlled pawl sliding with the setting gear for releasably locking it against inadvertent rotation, and means rotatable with the step gear for releasing said pawl for the period of actuation of the setting gear.

34. In a calculating machine, the combination with a step gear, and a setting gear slidable with respect to said step gear, of a spring-controlled pawl and a tripping arm slidable with the setting gear for locking it against inadvertent rotation, and means rotatable with the step gear for engaging said tripping arm to release the pawl for the period of rotation of the setting gear.

35. In a calculating machine, the combination with a step gear, and a setting gear slidable with respect to said step gear, of a rock shaft parallel to the axis of the setting gear and slidable therewith, a pawl on said rock shaft for locking the setting gear against inadvertent rotation, a tripping arm on said rock shaft spaced from said pawl, a spring normally holding the pawl in locking position, and means rotatable with the step gear for engaging said tripping arm to release the pawl for the period of rotation of the setting gear.

36. In a calculating machine, the combination with a step gear, and a setting gear slidable with respect to said step gear, of a spring-controlled pawl sliding with the setting gear for releasably locking it against inadvertent rotation, and a stepped segmental cylinder rotatable with the step gear for releasing said pawl for the period of actuation of the setting gear.

37. In a calculating machine, the combination with a step gear, and a setting gear slidable with respect to said step gear, of a spring-controlled pawl and a tripping arm slidable with the setting gear for locking it against inadvertent rotation, and a stepped segmental cylinder rotatable with the step gear for engaging said tripping arm to release said pawl for the period of rotation of the setting gear.

38. In a calculating machine, the combination with a step gear, and a setting gear slidable with respect to said step gear, of a rock shaft parallel to the axis of the setting gear and slidable therewith, a pawl on said rock shaft for locking the setting gear against inadvertent rotation, a tripping arm on said rock shaft spaced from said pawl, a spring normally holding the pawl in locking position, and a stepped segmental cylinder rotatable with the step gear for engaging said tripping arm to release the pawl for the period of rotation of the setting gear.

39. In a calculating machine, a plurality of setting gears, step gears for variably actuating said setting gears, members one for moving each setting gear longitudinally of its axis with respect to its step gear, each member having a series of positioning bearings, and an alining bar adapted to simultaneously engage said positioning bearings on a plurality of said moving members.

40. In a calculating machine, a plurality of setting gears, step gears for variably actuating said setting gears, members one for moving each setting gear longitudinally of its axis with respect to its step gear, each member having a series of positioning bearings, a pivoted alining bar adapted to simultaneously engage said positioning bearings on a plurality of said moving members, and means for swinging said alining bar.

41. In a calculating machine, a plurality of setting gears, step gears for variably actuating said setting gears, members one for moving each setting gear longitudinally of its axis with respect to its step gear, each member having a series of notches, and an alining bar having an edge adapted to engage said notches on a plurality of said moving members.

42. In a calculating machine, a plurality of setting gears, step gears for variably actuating said setting gears, members one for moving each setting gear longitudinally of its axis with respect to its step gear, each member having a series of notches, a pivoted alining bar having an edge adapted to engage said notches on a plurality of said moving members, and means for swinging said alining bar.

43. In a calculating machine, a plurality of setting gears, step gears for variably actuating said setting gears, members one for moving each setting gear longitudinally of its axis with respect to its step gear, each member having a series of tapered notches, and an alining bar having a tapered edge adapted to engage said notches on a plurality of said moving members.

44. In a calculating machine, the combination with a parallel series of setting gear shafts and step gear shafts, means for actuating one of said series and registering means connected to the other series, of setting gears on said setting gear shafts and step gears on the step gear shafts to engage said setting gears, said step gears each having its ends cut away on opposite sides of the line of steps, whereby said step gear shafts may be placed closer together and the stepped portion of two adjacent gears clear each other.

45. In a calculating machine, a series of parallel step gear shafts, and step gears on said shafts, said shafts being spaced apart a distance less than the diameter of the gears and said gears having their opposite ends cut away on opposite sides of the line of steps to clear each other.

46. In a calculating machine, a series of parallel step gear shafts, and step gears on said shafts, said shafts being spaced apart a distance less than the diameter of the gears and said gears having their opposite ends beveled at opposite sides of the line of steps to clear each other.

47. The combination with a series of parallel shafts and step gears on said shafts, said shafts being spaced apart a distance less than the diameter of the step gears and said step gears having each a hub portion and a stepped portion oblique to said hub portion, the stepped portions of adjacent gears being parallel to and clearing each other.

48. The combination with a series of parallel shafts and step gears on said shafts opposite one another, said shafts being spaced apart a distance less than the diameter of the step gears and said step gears having each a hub portion and a stepped portion oblique to said hub portion, the stepped portions being parallel to and clearing each other.

49. A step gear having a hub portion and a peripheral stepped portion oblique to said hub portion, whereby two such step gears may be placed opposite each other upon adjacent shafts which are closer together than the sum of the radii of the stepped portions and clear each other in turning.

In testimony whereof I have signed this specification in the presence of two subscribing witnesses.

JOSEPH BLAUSTEIN.

Witnesses:
   Howard P. King,
   Mildred E. Brooks.